Sept. 12, 1950     J. O. THORSHEIM     2,522,411
CONTROL DEVICE
Filed Sept. 24, 1943                 3 Sheets-Sheet 1
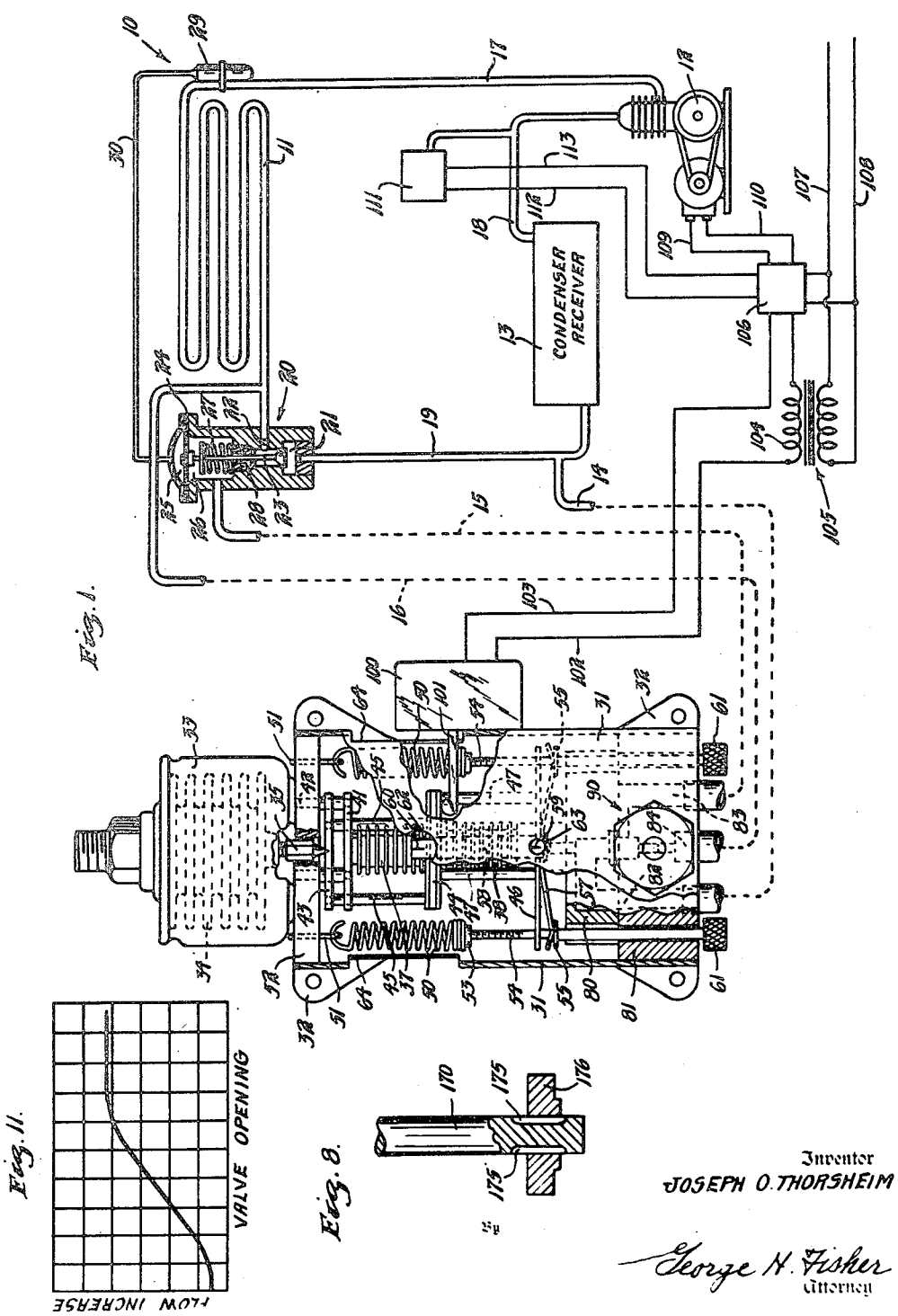
Inventor
JOSEPH O. THORSHEIM
George H. Fisher
Attorney

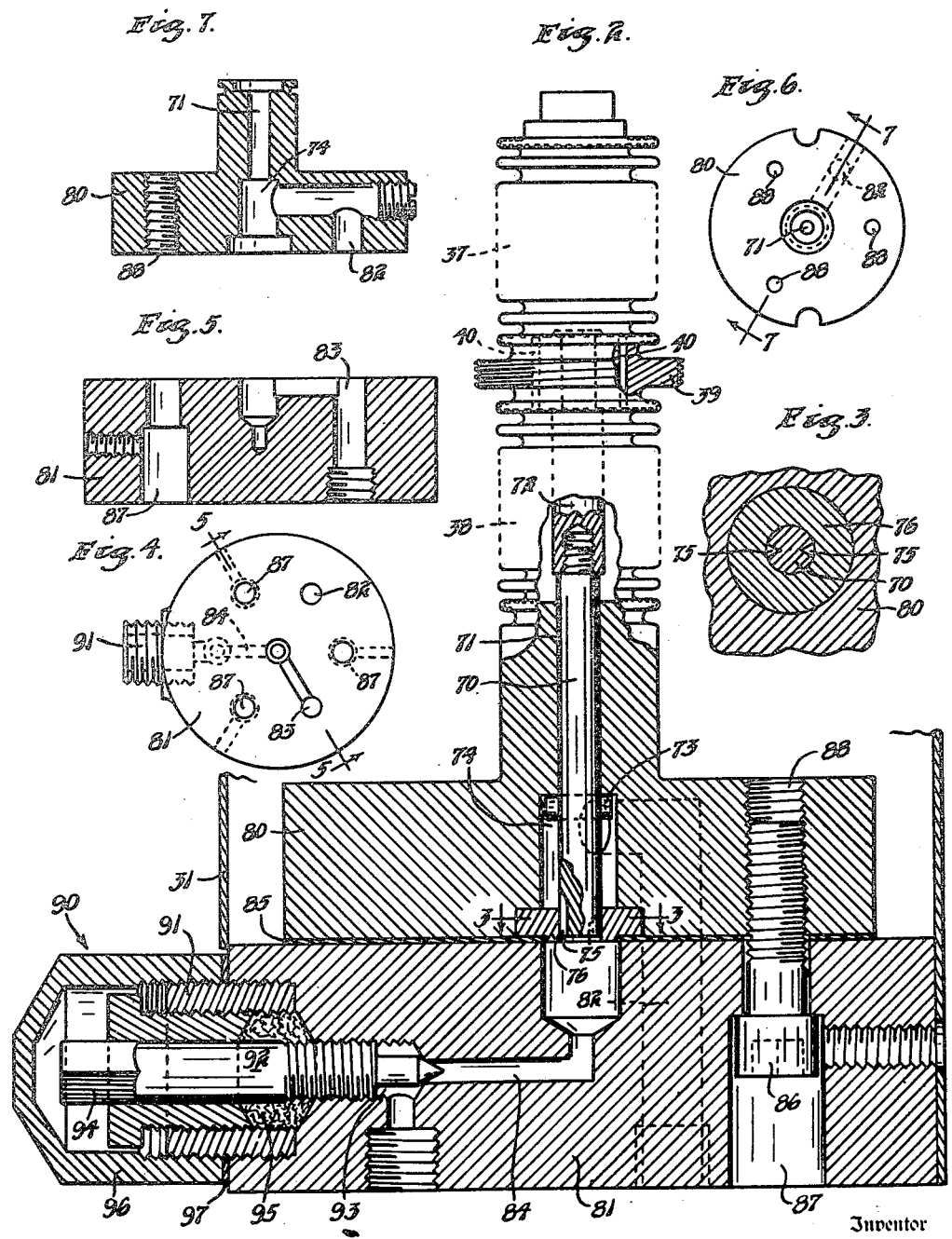

Sept. 12, 1950        J. O. THORSHEIM        2,522,411
CONTROL DEVICE
Filed Sept. 24, 1943        3 Sheets—Sheet 3
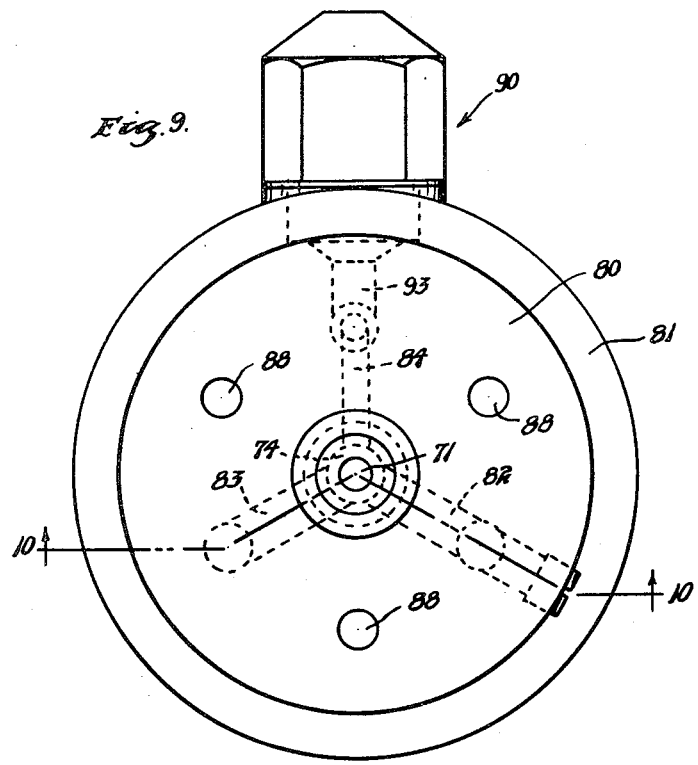
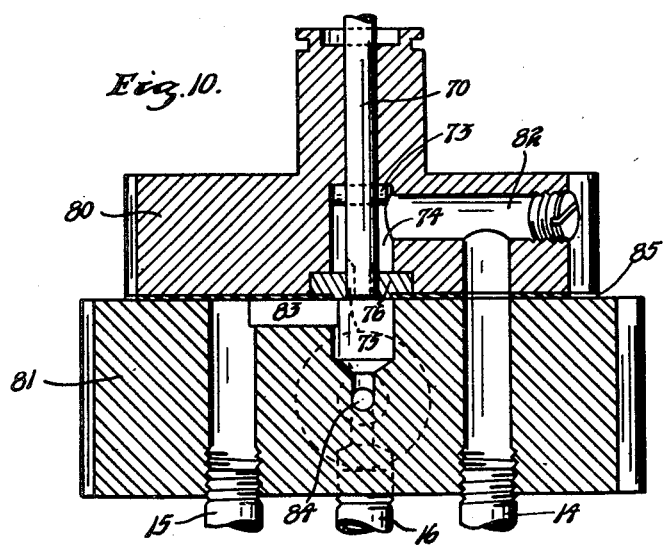
Inventor
JOSEPH O. THORSHEIM
By
George H. Fisher
Attorney Patented Sept. 12, 1950

2,522,411

UNITED STATES PATENT OFFICE 2,522,411

CONTROL DEVICE

Joseph O. Thorsheim, Minneapolis, Minn., assignor to Minneapolis-Honeywell Regulator Company, Minneapolis, Minn., a corporation of Delaware Application September 24, 1943, Serial No. 503,633

15 Claims. (Cl. 137—153)

This invention relates to an improved control device for use in systems such as a refrigeration unit of an air conditioning system or in other systems which may be operated by modulation or by an "on" and "off" movement of a control member. The present invention is in part directed to improvements in the control device shown in United States Patent 2,306,463 to Alwin B. Newton.

One of the essential features of an air conditioning system must be its ability to maintain a fairly uniform temperature within the space to be affected by its operation. This is a highly variable condition and will be affected by such factors as the outside temperature, the temperature of the fresh air being drawn into the system, the number of persons within the controlled space and the frequency with which doors or other vents are opened. Consequently, means must be provided for varying the amount of cooling dependent upon the demand. This is generally accomplished by passing all of the air periodically over a cooling coil or evaporator and regulating the flow of refrigerant to said coil. To accomplish this result efficiently, control must be dependent upon the temperature of the air within the space and the temperature of the cooling coil.

In a system under consideration, a thermostatic expansion valve is provided to regulate the flow of refrigerant to the coil. This valve in turn is primarily controlled by means such as a pressure fluid filled bulb which is in intimate contact with a portion of the outlet side of the evaporator coil, and secondly by means dependent upon the ambient temperature in the return duct or the controlled space. In one of the systems contemplated the primary control is dependent upon the amount of superheat produced within the cooling coil and particularly near the outlet thereof. The pressure thus derived which is more or less dependent on the amount of superheat within the coil is transmitted to a diaphragm valve in such a manner as to move the valve to at least a partially open position permitting an increased flow of fluid refrigerant to the coil; however, experience has taught that this method of control is not entirely satisfactory in that it permits a fluctuation in the flow of fluid to the coil and a resulting variation in the temperature of the controlled space, therefore it has been found necessary to modulate this flow in such a manner as to provide a relatively constant temperature. The modulating control which forms the substance of the present invention consists of means for controlling a relatively small flow of fluid to the opposite side of the diaphragm of the thermal expansion valve so as to counteract the action produced by the primary control. This modulating control tends to prevent excessive flow of refrigerant to the coil and is actuated by means which are dependent upon the temperature within the return duct or the space to be controlled. The present invention does not contemplate a change in the system of operation set forth in the previously mentioned Newton patent but rather relates to improvements in the modulating control means, whereby more sensitive control is provided for different systems or for the same system where different degrees of efficiency of operation are desired in various applications.

I have discovered that in order to obtain a more perfect form of modulation, the valve controlling means, which governs the flow of fluid to the under side of the diaphragm in the thermostatic expansion means, must be adapted to move readily without encountering dynamic forces arising from the controlled fluid. Also, the valve mechanism should be adapted so that in the opening movement, a flow of fluid should at first be gradual, followed by a change to a higher rate of flow, and as the valve approaches its maximum open position the rate of change should again become gradual. This method of operation prevents a hunting action on the part of the valve mechanism which is more likely to occur where the valve mechanism is not capable of gradual change in the two extremes of its position. Furthermore, in order to facilitate the application of this device to different devices and systems or to differing conditions of operation, it may be necessary to vary the amount of fluid which is expanded into the chamber formed in the under side of the diaphragm. To obviate the necessity for supplying interchangeable valves of varying capacity I provide a variable restriction in the outlet or downstream side of the valve, which restriction serves as a by-pass for the excess over the desired capacity requisite for control means. Moreover, in studying and observing the application of this control means to commercial systems, I have discovered other and further improvements which also form a part of this invention, and which must be regarded as an advance in the art of refrigeration control.

The principal object of my invention is to provide a highly accurate and quickly responsive control device for assisting in the proper operation of a control member such as a thermostatic expansion valve or other device which is capable of moving between an "on" and "off" position.

Another object is to provide a valve mechanism whose flow characteristic on moving to open position provides first a gradual increase, which changes to a rapid rate of flow and, upon approaching a full open position, again provides a gradual change in the rate of increased flow.

Another object is to provide valve sealing means which do not hamper the operation of the valve.

Another object is to provide a variable restriction on the outlet side of the valve to by-pass the excess fluid over the desired flow of the control fluid.

Another object is to provide a limit switch, operable to affect an electric circuit or other control means, in the event that the operating member is moved to an extreme position.

Other objects and advantages will become apparent upon reference to the specification, claims, and appended drawings in which the invention is shown as being applied to an air conditioning system and wherein like reference characters represent like parts in the various views and wherein:

Figure 1 is a view showing one form of a control system embodying this invention, many of the parts being shown in cross section with portions broken away to show interior views and the control system being applied to a cooling coil for use in an air conditioning system;

Figure 2 is a view partly in cross section of the principal operating mechanism;

Figure 3 taken along the lines 3—3 of Figure 2 shows a cross section of the valve and its related seat;

Figure 4 is an elevation of the lower valve block;

Figure 5 is a cross section of the lower valve block, taken on the lines 5—5 of Figure 4;

Figure 6 is an elevation of the upper valve block;

Figure 7 is a cross section of the upper valve block taken on the lines 7—7 of Figure 6;

Figure 8 is an alternative form of valve construction;

Figure 9 is an elevation of the upper and lower valve blocks assembled, showing the various passages in dotted lines;

Figure 10 is a cross section taken on the lines 10—10 of Figure 9; and

Figure 11 is a graphic view of the flow characteristic of the valve mechanism.

Referring now to Figure 1, the invention is shown as being applied to an air conditioning system 10 of any of the usual types, having an evaporator or cooling coil 11 properly connected to a compressor 12, a condenser-receiver system which is diagrammatically illustrated as 13 and a thermostatic expansion valve 20.

The thermostatic expansion valve 20 has an inlet 21, an outlet 22, and a valve stem 23 which opens the valve on downward movement. The valve stem is connected to the diaphragm 24 forming the chambers 25 and 26. A spring 27 is suitably attached to the valve stem and biases the valve to a closed position. Valve packing 28 serves to prevent the flow of fluid refrigerant passing from the inlet 21 to the outlet 22 from entering the chamber 26. A fluid filled bulb 29 is fastened in intimate contact with the outlet portion of the coil 11 and is connected with the chamber 25 by means of the line 30.

The modulating control valve whose parts constitute the present invention has an outer casing 31 which is suitably fastened to a bracket 32 for attachment to a panel or wall member. The device is controlled by a pressure operated mechanism shown at 33 which is suitably connected to a fluid bulb not shown, but located in the air duct leading to the coil or evaporator or to such other pressure or temperature control means which are adapted to exert a fluid pressure when the temperature of the air in the duct or the controlled space is above the desired controlled temperature. The pressure operated mechanism contains an expansible bellows 34 which is suitably fastened to an adjustable driving pin 35. The pressure operated mechanism is adapted to be secured to the top of the modulating control device, as shown in Figure 1.

Referring now to Figures 1 and 2, there is shown a pair of expansible bellows 37 and 38 which are joined in a longitudinal manner by the coupling 39 having intercommunicating passages shown by the dotted lines 40. The upper bellows 37 is sealed at its upper end and suitably fastened to a cross member 41, and except for the intercommunicating passages 40, it is sealed at its lower end and suitably fastened to the coupling 39. The lower bellows 38 has a rod 72 and a valve stem 70 passing through its center portion as seen best in Figure 2, and serves as a frictionless sealing means for said valve stem. The bellows 38 is sealed at its lower end and suitably fastened to an upper valve block 80, while at its upper end it is also fastened to the coupling 39. The inner cross member or coupling 39 to which the intermediate ends of the bellows are fastened is also rigidly fastened to a cross member 44 by the screw threaded periphery shown in Figure 2. The cross member 41 is mounted in a stationary manner to a plate 52 which forms the top surface of the modulating device, by pins 42. Another cross member 43 is situated above member 41 and is engaged by the pin 35. The member 43 is mounted slidably on the pins 42 and is held in rigid engagement with the intermediate cross member 44 by means of a plurality of pillars 45, one of which passes freely through cross member 41, as shown. A lower cross member 46 is likewise held in rigid engagement with the intermediate cross member 44 by means of pillars 47. It should be evident from the foregoing explanation that the upper and lower extremes of the bellows 37 and 38 are sealed and rigidly fastened, while the center portion of the bellows is movable in a longitudinal direction when urged by the upper and lower cross members 43 and 46, and although this movement is only to a limited extent as would be defined by the resiliency of the bellows, the movement is sufficient to accomplish the desired result which will be explained hereinafter.

As shown in Figure 1, there are a pair of resilient tension springs 50 which are suitably mounted by means of staples 51 to the plate 52 which forms the upper surface of the modulating device. The lower ends of the springs are suitably attached to a pair of plugs 53, which are screw threaded onto rods 54. A pair of shoulders 55 formed on the rods 54 are in engagement with a rockable yoke 57, which in turn is positioned beneath the lower cross member 46. A vertical member 58 having marks or vertical index lines 59 and 60, whose purpose will be explained, is suitably mounted to the rockable yoke 57. The foregoing arrangement serves to return the valve mechanism to a normally open position after the force which had moved it in the direction of a closed position has abated. The spring members may be adjustably tensioned to give the desired reaction by means of knurled knobs 61 which extend below the modulating member; however, the tension on the two springs must be identical to prevent binding in the movement of the valve mechanism which would result if the spring tension were unequal. Since the outer periphery of the yoke 57 is in engagement with the rods 54 and since the shoulders 55 are in engagement with the lower side of the rockable yoke 57 the index member 58 will indicate a condition of balanced tension of the two springs. With the outer casing 31 in place this condition will be evident from the index markings 59 and 60 which are visible through the apertures 62 and 63 and the indices may be aligned with each other. For the purpose of inspecting the interior of the device or for changing the spring members should that be necessary, a pair of large ports 64 are provided which ports are normally covered with a pair of sheet metal plates (not shown) which may bear the name and trade-mark of the assignee of this invention.

Referring now to Figure 2, the valve stem 70 which is slidable within a bore 71 is screw threaded into the rod 72 which in turn is suitably secured to the center of the coupling member 39 which joins the bellows 37 and 38. Suitably secured on the valve stem 70 on its lower mid-portion is a pin 73 of slightly smaller dimension than the chamber 74 within which it is movable, to restrict the downward movement of the valve stem 70. At the lower end of the valve stem 70 are a pair of V-shaped longitudinally tapered cuts 75 which cooperate with a sharp edged collar 76 to serve as a valve passage means. Another view of the cooperation of the V-cuts 75 and the valve seat member 76 will be seen in Figure 3.

Referring now to Figures 2, 4, 5, 6, 7, 9, and 10, the construction of the upper valve block 80 and the lower valve block 81 and their associated parts is shown. Passage 82 is the fluid inlet, 83 is the fluid outlet to the chamber 26 of the expansion valve, and 84 is a restricted outlet, which is in fluid connection with the outlet 83 but which serves to by-pass a desired portion of the excess fluid over the amount needed for correct modulation of the device. The two blocks are separated by a gasket 85, and are secured together by studs 86, of which only one is shown, passing through bores 87 in the lower block 81 and threaded bores 88 in the upper block 80.

A means of controlling or adjusting the by-passing of the excess of refrigerant over the amount necessary to give the desired modulating pressure is provided by the device shown at 90, which forms a part of the lower valve block. The device comprises a nipple 91 which is threaded at both ends and is adapted to fit into a threaded recess of the base 81. Within the nipple 91 is a threaded needle valve 92 which is screwed into a chamber 93 of block 81 and abuts the sharp edges of the narrow passageway 84 to produce a restricted passage or valve. The valve may be adjusted to the desired opening by applying a wrench to the square head 94. Packing 95 provides a seal for the needle valve 92. A seal cap 96 is threaded onto the outer portion of the nipple 91 and fits against a gasket 97 to provide a further means of preventing escape of refrigerant, and serves also to protect the valve head 94 from tampering or injury.

A limit switch 100 is shown attached to the outer casing 31 of the modulating control and has an inwardly extending arm 101, in engagement with the cross member 44. The purpose of the switch is to operate through a relay, to open or close a circuit to the compressor motor. In the event that the temperature in the controlled space is at its lower limit, continued operation of the compressor would cause the space to become cooler than desired even though the modulating device is in an extreme "off" position. Under these conditions the member 44 would move to its extreme upper position causing the arm 101 to break the aforementioned circuit. Then as the controlled space begins to warm up, a demand for refrigeration as evidenced by a downward movement of the member 44 would close the circuit affecting the compressor causing the motor to start. The circuit may be traced as follows: from a secondary coil 104, of a transformer 105, through conductor 102, to the snap switch 100, and conductor 103, to the relay 106, and back to the secondary, thus providing a circuit from an outside source 107 and 108 to the conductors 109 and 110, to the compressor 12. A pressure operated switch 111, is also suitably connected to the relay 106 by conductors 112 and 113 and is adapted to stop the compressor motor when the value of the pressure on the high pressure side of the compressor within the pipe 18, rises above a predetermined value as might occur for example on failure of the cold water supply to the condenser system.

Pipe connection 14 connects the receiver 13 to the inlet 82 of the modulating device, pipe 15 connects the outlet 83 of the modulating device to the lower chamber 26 of the thermostatic expansion valve and pipe 16 connects the by-pass 84 of the modulating device with the inlet side of the coil. Pipe 17 is on the suction side of the pump and pipes 18 and 19 are on the high pressure side of the pump.

In operation, a current of air from the space to be controlled plus a certain percentage of fresh air being drawn in from the outside will be passing over the evaporator coil 11 under the influence of a fan, not shown, causing an evaporation of the fluid refrigerant within the coil. A rise of the sensitive temperature within the coil will cause an increase of the pressure within the bulb 29 which will be transmitted within the line 30 to the upper diaphragm chamber 25 of the thermal expansion valve 20. This will cause the diaphragm 24 to deflect in a downward direction opening the valve 23, permitting the fluid refrigerant to pass from the inlet 21 to the outlet 22 of the valve member. Under the influence of a rise in the temperature of the air entering the duct or in the space to be cooled, pressure will be transmitted to the member 33 from the pressure-temperature system and said pressure will be transmitted to the bellows 34 and pin 35 to the member 43 and member 44 causing the valve mechanism to move in a downward direction, thus restricting the flow of fluid through the V-cuts 75 and the outlet passage 83 through the pipe 15 to the lower chamber 26 of the thermal expansion valve 20. A decrease in this pressure permits a more extended movement in the downward direction of the diaphragm 24 thus depressing the valve 23 and allowing a greater flow of fluid refrigerant into the coil 11. As the temperature within the controlled space is lowered to a desired level, the pressure being transmitted to the member 33 will decrease, permitting a retraction of the bellows 34 and the pin 35 and under the influence of the resilient members 50 the yoke 57 will tend to move the operating member in an upward direction thus opening the valve and permitting a greater fluid flow from the inlet 82 to the outlet 83. As the increased flow of fluid refrigerant enters the lower diaphragm chamber 26 of the thermal expansion valve 20, its effect is to merely form a fluid pressure which in turn will cause the diaphragm 24 to move in an upward direction and in opposition to the pressure existing in the upper chamber 25, simultaneously moving the valve 23 to an upward or toward closed position. Thus it should be apparent that the function of the modulating member is to supplement the operation of the thermostatic expansion valve and adjust its operation to the closely defined needs of the system. Under normal summer-time operation, the air to be conditioned will be in constant need of a slight amount of refrigeration, although this need may be greatly extended on extremely warm days; therefore from a practical standpoint there will be a constant amount of refrigerant being expanded into the coils at all times and the device of this invention will be more or less constantly modulating the operation of the thermal expansion valve as the demand on the system rises and falls.

In order to better understand those features of the invention which I believe to be new, they will be described with more particularity. Referring to Figures 1 and 2, the bellows 37 and 38 are joined longitudinally at one of their ends by the coupling 39 which has a plurality of intercommunicating apertures 40. It will be observed that the upper bellows 37 is joined at its upper end to the cross member 41 while the lower bellows 38 is fastened at its lower end to the upper valve block 80 and that the valve 70 coupled with the rod 72 is coupled to the member 39 in the center of the two bellows. It will be further observed that although the valve stem 70 fits closely within the bore 71 of the upper valve block 80, there is no packing material used on the stem and therefore the fluid refrigerant will be able to pass up into the bellows 38 and thence through the communicating channels 40 into the bellows 37 so that during operation the two bellows 37 and 38 are constantly filled with the fluid refrigerant and the pressures therein balanced. If the operating impulse from the pin 35 were communicated directly to the cross member 44 at the coupling 39 without intercommunication between the bellows, there would be a tendency to compress the bellows 38 but since the bellows member is filled with the fluid refrigerant it would oppose this compression and would require a greater force to secure movement of the valve member 70, but with the intercommunicating passages 40 this problem is obviated, for as bellows 38 is compressed bellows 37 is extended and thus the fluid refrigerant is free to pass from one bellows to the other without retarding the action of the valve member, and since both of these bellows are sealed their functions may in part be described as a non-frictional packing for the valve stem. Similarly, if the fluid pressure should change, this likewise will have no effect upon the valve as the pressure will be transmitted to the upper bellows without affecting the valve position.

In observing the operation of the valve member 70 in conjunction with the ring seat 76, the inlet 82 and outlet 83, it will be seen that the valve is positioned in a normally open position. This is merely an application for a particular system and may be modified to a normally closed position as shown in the modification illustrated in Figure 8 wherein the valve stem 170 has V-cuts 175 positioned with relation to the ring 176 so that when the valve stem 170 is in its normal position the passage is closed. This modification would of course require a change of other features but would not alter the scope of the invention. However, I have found that when it is necessary to move the valve of either type shown from an open to a closed position the usual and conventional valve means which provides a straight line increase or decrease of flow does not give the conditions best applicable to this system and that a rapid change in the rate of flow preceded by gradual changes at the beginning and end of the operation are a much more highly desirable form of operation. The reason for this preferred embodiment is to prevent a "hunting" action by the valve of the controlled device, or expansion valve. By referring to Figure 1 it will be seen that the purpose of this device is to prevent extreme action of the diaphragm controlled valve 23. If the flow characteristics of the V-cuts 75 were of the straight line nature, a call for additional refrigerant in the evaporator 11 would, in the early increments of movement, cause a sudden decrease of the amount of fluid pressure extending to the chamber 26 which would in turn permit a rapid opening of valve 23 to the point where an excessive amount of refrigerant would be permitted to enter the evaporator. This action would in turn cause a sudden change of condition within the evaporator resulting in a sudden reaction of bulb 29 to cause complete closure of valve 23. Thus it is apparent that valve 23 would be subjected to a continuing "hunting" action in an attempt to maintain an equilibrium. However, when the flow characteristics of the V-cuts 75 produce a gradual change during the early increments of movement, followed by a rapid change, a balanced effect is obtained and the valve 23 is modulated in its operation to meet the demands of the system. Therefore the configuration of the V-cuts is important. At the upper point in shaft 70 where the V-cuts commence, the grooves are tapered both in width and depth until they reach the maximum depth in the shaft, thereafter the grooves are of uniform dimension to the end of the shaft 70 as seen in Figures 2 and 3. Therefore as the valve 70 is moved to a closed position in response to a call for additional refrigeration the flow characteristics remain relatively unchanged during the early increments of movement of the valve 70 but change rapidly as the tapered portion passes through the restriction 76. In the case of the V-cuts 175, the construction is essentially the same, but since the grooves are not at the end of the shaft, they are of sufficient length to accomplish the desired results. By observing the graphical rate of change of flow shown in Figure 11, it will be seen that when the valve is in a closed position represented at the left of the chart, there is a slight flow or leakage, this is not undesirable as I do not seek to have an absolutely tight internal sealing means. However, it will be observed that in the opening operation in the first increment of movement the rate of change is very gradual but increases rapidly through the intermediate increments of movement and finally produces only a very slight increase if any during the latter portion of the movement of the valve member. When it is understood that in this particular application the total movement of the valve member is only .09 inch, although I do not restrict myself to this sole application, it will be seen that extremely delicate control is essential.

It is recognized that the application of resilient members such as the springs 50 for moving a valve member from one position to another is not new. However, in this application there are certain features in the operation of these members which I consider highly desirable. Primarily, they can be removed through the apertures 64 in the outer wall 31 should there be necessity of replacing them, without having to tear down the valve mechanism. Further, the springs may be tensioned to give the desired resiliency by rotating the rods 54 with the knobs 61 to alter the positions of the plugs 53, and as it is absolutely essential that the valve member move in a straight up and down fashion or have a longitudinal movement without side stresses, the resiliency of the two springs may be balanced by observing the cuts 59 and 60 through the apertures 62 and 63 in the outer casing 31.

It should be understood that the fluid refrigerant which passes from the outlet 83 through the pipe 15 to the expansion chamber 26 does not actually enter the cooling coil 11 but merely serves to provide a modulating pressure. Since this pressure will vary according to the needs of the system and since for application to different commercial systems upon which the device may be applied, an actual outlet or a by-pass 84 is provided wherein the excess refrigerant may enter the coil 11. This function is performed by the needle valve 92 which is adjustable as shown in Figure 2. The valve may be appropriately set so as to by-pass the excess fluid over that which is needed for the modulating function and should there be an excessive amount of fluid in the expansion chamber 26 it may return through the pipe 15, the outlet 83, and finally pass out through the outlet 84, pipe 16 to the coil 11.

It is well known in the refrigeration art that the degree of cooling rendered by a coil or evaporator is largely dependent upon maintaining an extremely low pressure of the vapors within the coil. For applications to systems in which intermittent demand of refrigeration for the evaporator or coil would be applicable, I have provided a limit switch 100 having an operating arm 101 in contact with the cross member 44, positioned so that when there is need of refrigeration as indicated by pressure on the member 43 by pin 35, depression of the cross member 44 will cause the arm 101 to close a circuit through conductors 102, 103, the secondary coil 104 of the transformer 105, and the relay 106 so that power may be applied to the conductors 109 and 110 for the operation of the compressor represented at 12 during the periods when there is a call for refrigeration, but should the member 44 be moved to its upper extreme, indicating no need for refrigeration, the resilient arm 101 will move to its upper position thereby opening the circuit and shutting down the compressor 12.

Although I have disclosed my invention as being applied to a refrigerating system of an air conditioning device, it will be understood by those skilled in the art that the various features would be applicable to other forms of valves, switches, and controlling instruments.

I claim as my invention:

1. In a device of the class described, in combination, a control member movable between substantially two positions in relation to a cooperative member, a first yieldable means for inducing movement of said control member in the direction of one of its positions, a pair of spaced resilient means cooperating with a member movable in unison with said control member to move said control member in the direction of its other position, a fixed reference point, and a single indicator means associated with said movable member and movable with respect to said reference point to indicate when a balanced condition of said resilient means exists.

2. In a valve body comprising, in combination, a pair of expansible chambers having fluid communication with each other, a member interposed between said chambers, a valve stem positioned within one of said chambers and mounted on said member, a pair of movable members located adjacent the opposite ends of said chambers and means connecting said movable members with said interposed member to move said valve stem.

3. In a control device, in combination, a movable valve stem, a member having an aperture therein which cooperates with said valve stem to restrict fluid flow through said aperture, a stationary member, a rockable member having longitudinal movement with said valve stem, a pair of tension springs positioned between said stationary member and said rockable member for moving said valve stem in one direction with respect to said aperture, means for individually adjusting the tension of said springs and a member cooperating with said rockable member to indicate a balanced tension of said springs.

4. In a control mechanism, in combination, a stationary member and a rockable member, a pair of springs mounted to urge said rockable member in the direction of said stationary member, means for individually adjusting the tension of said springs, and means associated with said rockable member for indicating balanced tension of said springs, said indicating means comprising a pointer arm extending laterally from said rockable member.

5. In a device of the class described, in combination, a valve stem movable between substantially two positions, valve stem sealing means comprising a pair of intercommunicating bellows joined longitudinally on one of their intermediate ends to a cross member, said valve stem mounted on said cross member and positioned within one of said bellows, means for moving said valve stem in the direction of one of its positions, and a pair of springs located on the opposite exterior sides of said bellows cooperating with a member and arranged to move said valve stem in the direction of its other position.

6. In a device of the class described, in combination, a valve stem movable between substantially two positions, valve stem sealing means comprising a pair of intercommunicating bellows joined longitudinally on one of their intermediate ends to a cross member, said valve stem mounted on said cross member and positioned within one of said bellows, means for moving said valve stem in the direction of one of its positions, a pair of springs cooperating with a member and arranged to move said valve stem in the direction of its other position, and means operably connected to one end of the each of said springs for indicating a balanced tension of said springs.

7. In a device of the class described, in combination, valve means comprising a valve stem having a passage in the outer periphery of said stem, a member having an aperture cooperating with said stem and said passage to restrict fluid flow through said passage, a frictionless seal for said valve stem comprising a plurality of bellows joined on one of their intermediate ends to a cross member, said valve stem mounted on said cross member and positioned within one of said bellows, means for moving said valve stem in one direction with relation to said aperture, and a pair of springs located on the opposite exterior sides of said bellows operably mounted to move said valve stem in another direction with relation to said aperture.

8. In a device of the class described, in combination, valve means comprising a valve stem having a passage in the outer periphery of said stem, a member having an aperture therein cooperating with said stem and said passage to restrict fluid flow through said passage, a frictionless seal for said valve stem comprising a pair of intercommunicating bellows joined on one of their intermediate ends to a cross member, said valve stem mounted on said cross member and positioned within one of said bellows, means for moving said valve stem in one direction with relation to said aperture, a pair of springs operably mounted to move said valve stem in another direction with relation to said aperture, and means associated with said springs for placing them under equal tension.

9. In a device of the class described, valve means comprising a valve stem having a passage in the outer periphery of said stem, a member having an aperture therein cooperating with said stem and said passage to restrict fluid flow through said passage, valve stem sealing means comprising a pair of intercommunicating bellows joined to an intermediate member, said valve stem being mounted on said intermediate member within one of said bellows, and a pair of movable members located adjacent the opposite ends of said inter-communicating bellows having members extending parallel with said bellows connected to said intermediate member for moving said valve stem.

10. In a device of the class described, in combination, a valve stem having a longitudinal passage positioned on its outer periphery, a portion of said device having an aperture which cooperates with said valve stem and said passage to restrict fluid flow through said passage, means for moving said valve stem in one direction with relation to said aperture, a pair of yieldable means mounted to move said valve stem in another direction with relation to said aperture, and means operably mounted with relation to said yieldable means to indicate a balanced dynamic force applied to each of said yieldable means.

11. In a control device, in combination, a stationary member, a movable member, a plurality of springs anchored at one of their ends, adjustment members swively connected to said movable member at spaced points thereon and screw threaded into the other ends of said springs to normally urge said movable member towards said stationary member, and means associated with said movable member for indicating a balanced tension of said springs.

12. In a control device, in combination, a stationary member, a movable member, a rockable member engaging said movable member, a plurality of springs anchored at one of their ends, adjustment members swively connected to said rockable member at spaced points thereon and screw threaded into the other ends of said springs to normally urge said movable member towards said stationary member, and means associated with said rockable member for indicating a balanced tension of said springs.

13. In a valve body comprising, in combination, a pair of expansible chambers having fluid communication with each other, a member interposed between said chambers, a valve stem positioned within one of said chambers and mounted on said member, a pair of movable members located adjacent the opposite ends of said chambers and adjustably connected to said interposed member to move said valve stem and a pair of spaced resilient means engaging one of said movable members for urging said valve stem toward the other member.

14. In a valve body, a pair of bellows coaxially joined at one of their ends to a cross member, the opposite end of one of said bellows being closed, a valve stem mounted on said cross member and extending through the other of said bellows, an aperture in said cross member for fluid communication between said bellows, means for resiliently urging said cross member in one direction, a movable member mounted adjacent the opposite end of one of said bellows and connected to said cross member for moving said valve stem in the opposite direction and condition responsive means for actuating said movable member.

15. In a control device, in combination, a movable member, a fixed member having an aperture therein through which said movable member extends, a pair of tension springs having one of their ends secured to said fixed member, a rockable member bearing against and movable with said movable member, means for adjustably connecting said rockable member to the other ends of said springs, and a member movable with said rockable member to indicate a balanced tension of said springs.

JOSEPH O. THORSHEIM.

REFERENCES CITED

The following references are of record in the file of this patent:

UNITED STATES PATENTS

| Number | Name | Date |
|---|---|---|
| 508,141 | Levey | Nov. 7, 1893 |
| 709,929 | Raven | Sept. 30, 1902 |
| 1,179,711 | Fitts | Apr. 18, 1916 |
| 1,350,385 | Peterson | Aug. 24, 1920 |
| 1,360,833 | Vuilleumier | Nov. 30, 1920 |
| 1,379,708 | Laing | May 31, 1921 |
| 1,524,225 | Allen | Jan. 27, 1925 |
| 1,565,086 | Gallagher | Dec. 8, 1925 |
| 1,580,479 | Frankenfield | Apr. 13, 1926 |
| 1,619,937 | Huff | Mar. 8, 1927 |
| 1,794,703 | Methudy | Mar. 3, 1931 |
| 1,802,510 | Hole | Apr. 28, 1931 |
| 1,821,988 | Rowles | Sept. 8, 1931 |
| 1,918,891 | Barrett | July 18, 1933 |
| 1,920,047 | Zoerb | July 25, 1933 |
| 1,926,333 | Fulcher | Sept. 12, 1933 |
| 1,965,054 | Powers | July 3, 1934 |
| 2,001,251 | Irving | May 14, 1935 |
| 2,080,760 | Condon | May 18, 1937 |
| 2,106,300 | Harrison | Jan. 25, 1938 |
| 2,117,182 | Lewis | May 10, 1938 |
| 2,280,407 | Harder | Apr. 21, 1942 |
| 2,296,563 | Moller | Sept. 22, 1942 |
| 2,306,463 | Newton | Dec. 22, 1942 |
| 2,326,825 | Bucknam | Aug. 17, 1943 |

FOREIGN PATENTS

| Number | Country | Date |
|---|---|---|
| 752,652 | France | July 24, 1933 |